April 8, 1930.  R. P. HIGBEE  1,753,927
POWER TRANSMISSION MECHANISM
Filed March 27, 1928

INVENTOR
Ray P. Higbee.
BY
ATTORNEY

Patented Apr. 8, 1930

1,753,927

UNITED STATES PATENT OFFICE

RAY P. HIGBEE, OF PHILADELPHIA, PENNSYLVANIA, ASSIGNOR TO WESTINGHOUSE ELECTRIC & MANUFACTURING COMPANY, A CORPORATION OF PENNSYLVANIA

POWER-TRANSMISSION MECHANISM

Application filed March 27, 1928. Serial No. 265,204.

My invention relates generally to power transmission mechanism and more particularly to such mechanism as may be employed in connecting a hoisting motor to a hoisting drum in an electrically operated elevator.

The object of the invention, generally stated, is the provision of a power transmission mechanism that shall be simple and efficient in operation and adapted for ready and economical manufacture.

A more specific object of the invention is to provide a gearless transmission mechanism for imparting a rotary motion from the hoisting motor to a hoisting drum at a reduced speed.

It is also an object of my invention to provide a gearless transmission mechanism in which the friction of the various cooperating parts is reduced to a minimum.

Other objects of the invention will, in part, be obvious and will, in part, appear hereinafter.

The invention, as disclosed in the accompanying drawing, comprises the structural features and combination of elements and arrangement of parts which will be hereinafter set forth and particularly defined in the claims.

Figure 1:
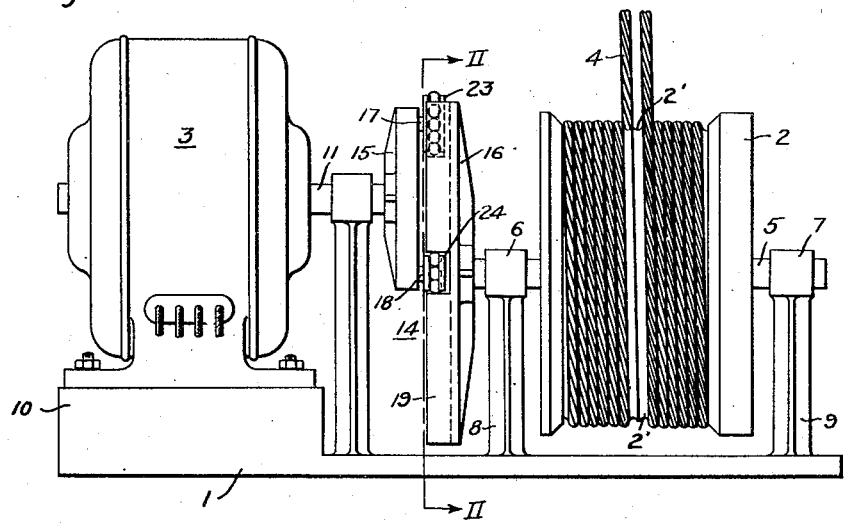
Figure 2:
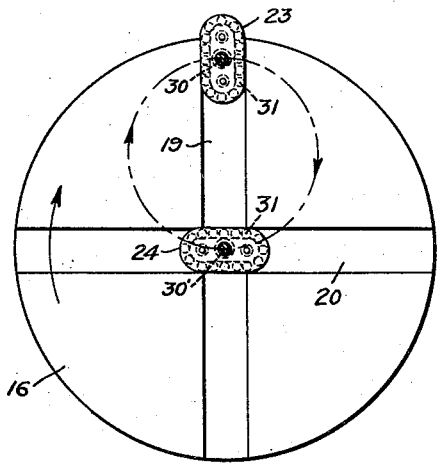
Figure 3:
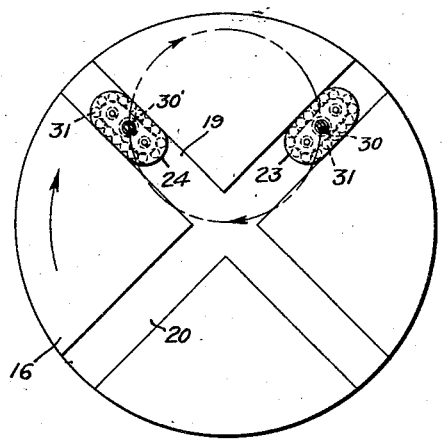
Figure 4:
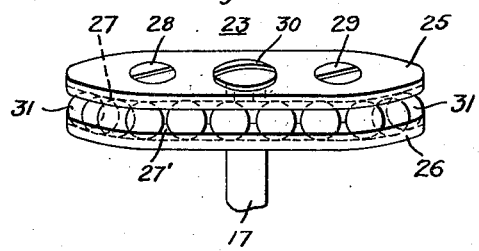

For a fuller understanding of the invention, reference may be had to the following detailed description taken in connection with the accompanying drawing in which, Figure 1 is a view in side elevation of an elevator power plant provided with a power transmission mechanism embodying my invention, Fig. 2 is an enlarged view taken on the lines II—II of Fig. 1, Fig. 3 is a view similar to Fig. 2, with the parts rotated in a clockwise direction, and Fig. 4 is an enlarged view, in perspective, of one of the sliding blocks embodied in the apparatus shown in the other figures of the drawing.

In the drawing, I have illustrated a power plant for an elevator as mounted on a common bed plate 1. The power plant comprises a hoisting drum 2 that is mounted on one end of the bed plate 1 for operating the elevator (not shown) and an electric motor 3 that is mounted on the other end of the bed plate for operating the hoisting drum.

The hoisting drum 2 is provided with a plurality of grooves 2' in its outer periphery to receive a hoisting cable 4 and is rigidly mounted on a shaft 5 that is seated in a pair of bearings 6 and 7 in upright members 8 and 9 of the bed plate 1.

As shown, the hoisting motor 3, which may be of any well known type, is mounted on a raised portion 10 of the bed plate with the axis of its rotatable shaft 11 parallel with the axis of the drum shaft 5 but out of alinement therewith. This arrangement is employed in order that the confronting ends of the motor shaft 11 and the drum shaft 5 may be connected by transmission mechanism 14 which will cause the drum shaft to be rotated at one-half the speed of the motor shaft.

The transmission mechanism 14 comprises a driving plate 15 that is secured to the end of the motor shaft 11, a driven disc 16 that is secured to the confronting end of the drum shaft 5, and a pair of connecting arms or stub shafts 17 and 18. In order that power may be transmitted from the driving plate 15 to the driven disc 16, the connecting arms 17 and 18 are firmly mounted on the face of the driven plate with their free ends extending into a pair of cooperating grooves 19 and 20 in the face of the disc. The grooves 19 and 20 are disposed in such manner that they cross at right angles at the center of the disc 16 and provide runways for a pair of substantially elliptical sliding blocks 23 and 24 that are pivotally mounted on the free ends of the connecting arms 17 and 18, respectively.

For the purpose of reducing the friction between the sliding blocks 23 and 24 and the side walls of the grooves 19 and 20 with which they engage the blocks are constructed with ball-bearing peripheries. The ball-races in each block are provided by making the block in two cooperating parts 25 and 26 with channels 27 and 27' in their adjacent outer edges to form ball raceways in which a plurality of rotatable balls 31 are disposed when the parts are assembled. The parts 25 and 26 of the blocks are fastened together by screws 28 and 29 and are retained in position on the connecting arms 17 and 18, respectively, by shoulder screws 30 and 30'.

Inasmuch as one of the objects of the invention is to reduce the speed of the drum shaft 5 to one-half the speed of the motor shaft 11, the connecting arms 17 and 18 are spaced apart on the driving plate 15 a distance that is equal to twice the distance between the axes of the motor shaft and the drum shaft. Then, when the blocks 23 and 24 are in the position shown in Fig. 2, if the motor 3 is operated to rotate its shaft 11, the plate 15 and the arms 17 and 18 thereon in a clockwise direction, the arm 17 will move the block 23 to the right and cause it to slide along the groove 19. At the same time, the block 24 on the arm 18 will be moved to the left and slide along the groove 20 through the position shown in Fig. 3. Inasmuch as the blocks travel in a circular path, the block 23 will press against the side wall of the groove 19 and the block 24 will press against the side wall of the groove 20 and thereby cause the disc 16 to rotate. As the rotation of the plate 15 is continued, the movement of the blocks 23 and 24 will be repeated, each block passing down one-half and up the other half of its cooperating groove while making one complete circle, thereby rotating the disc one-half of a circle during each revolution of the plate. In this manner, the disc 16 is rotated once during each two revolutions of the plate 15.

Each of the blocks 23 and 24 is made of considerably greater length than width for the purpose of providing a supporting contact between the sides of the groove during the passage of the block over the portion of the groove which is cut away by the intersection of the other groove. By so supporting the sliding block, the impact of the block striking the side walls of the groove on the opposite side of the intersection is eliminated, making a much more smoothly and quietly operating machine.

It will, therefore, be seen that I have provided an improved form of power transmission mechanism for connecting the operating shafts of a hoisting motor and a hoisting drum in an elevator system in such manner that the drum may be operated at one-half the speed of the motor and with a minimum amount of friction.

While the illustrated example constitutes a particular embodiment of my invention, I do not limit myself strictly to the details shown, since manifestly the same may be varied considerably without departing from the spirit of the invention as defined in the appended claims.

I claim as my invention:

1. In a transmission mechanism, a pair of rotatable shafts arranged with confronting ends, a disk secured to the confronting end of one shaft and having a plurality of crossed grooves in its outer face, a plate secured to the confronting end of the other shaft and means for operatively connecting the plate and the disk comprising a plurality of elongated blocks slidably disposed in said grooves, each of said blocks being constructed of two parts the adjacent edges of which are channeled to form a ball raceway, and a plurality of rotatable balls disposed in the raceway to engage the side walls of the grooves.

2. A sliding block comprising a pair of cooperating substantially elliptical members having cooperating channels in their peripheries to provide a ball raceway, a plurality of rotatable balls disposed in said raceway, and means for securing said members to each other.

In testimony whereof, I have hereunto subscribed my name this 20th day of March, 1928.

RAY P. HIGBEE.